(12) United States Patent
Nakamura (10) Patent No.: US 11,619,506 B2
(45) Date of Patent: Apr. 4, 2023

(54) PLAN CREATION APPARATUS, METHOD, AND PROGRAM

(71) Applicant: TOYOTA JIDOSHA KABUSHIKI KAISHA, Toyota (JP)

(72) Inventor: Akihito Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 109 days.

(21) Appl. No.: 16/935,283

(22) Filed: Jul. 22, 2020

(65) Prior Publication Data

US 2021/0131817 A1 May 6, 2021

(30) Foreign Application Priority Data

Nov. 1, 2019 (JP) .............................. JP2019-200068

(51) Int. Cl.
  *G01C 21/34* (2006.01)
  *G01C 21/36* (2006.01)

(52) U.S. Cl.
  CPC ..... *G01C 21/3469* (2013.01); *G01C 21/3407* (2013.01); *G01C 21/3679* (2013.01)

(58) Field of Classification Search
  CPC ............ G01C 21/3469; G01C 21/3407; G01C 21/3679; Y02T 10/70; Y02T 10/7072
  See application file for complete search history.

(56) References Cited

U.S. PATENT DOCUMENTS

| 2011/0246019 | A1* | 10/2011 | Mineta | ............. | B60W 50/0097 |
|---|---|---|---|---|---|
| | | | | | 903/903 |
| 2014/0052660 | A1* | 2/2014 | Lee | .................. | G06Q 10/04 |
| | | | | | 705/338 |
| 2015/0091505 | A1* | 4/2015 | Hyde | ...................... | B60L 53/52 |
| | | | | | 320/108 |
| 2015/0134206 | A1* | 5/2015 | Matsunaga | ........... | B60W 10/06 |
| | | | | | 701/123 |
| 2016/0304080 | A1* | 10/2016 | Sugiyama | ............. | B60W 30/16 |
| 2018/0314263 | A1* | 11/2018 | Aiuchi | ................. | A61G 3/0808 |
| 2020/0133288 | A1* | 4/2020 | Abari | .................. | G05D 1/0088 |

FOREIGN PATENT DOCUMENTS

| JP | 2002-63695 A | 2/2002 | |
|---|---|---|---|
| JP | 2004-236472 A | 8/2004 | |
| JP | 2007-62640 A | 3/2007 | |
| JP | 2013027234 A | * 2/2013 | ............. Y02T 90/16 |
| JP | 2016-203706 A | 12/2016 | |
| JP | 2019-121109 A | 7/2019 | |
| KR | 2020007177 A | * 1/2020 | .............. B60L 53/60 |

OTHER PUBLICATIONS

JP-2013027234-A English Translation.*
KR-2020007177-A English Translation.*

* cited by examiner

*Primary Examiner* — Rami Khatib
*Assistant Examiner* — Gabriel Joseph Rene Lambert
(74) *Attorney, Agent, or Firm* — Oblon, McClelland, Maier & Neustadt, L.L.P.

(57) ABSTRACT

A plan creation apparatus includes a prediction unit configured to acquire an operation plan for an electrical device mounted on a vehicle and used for a service other than functions of the vehicle and to predict a demand for electric power of the electrical device based on the operation plan, and a planning unit configured to create a travel plan in which electric power supplied to the electrical device for the service is secured based on the demand for electric power.

12 Claims, 5 Drawing Sheets

PLAN CREATION APPARATUS, METHOD, AND PROGRAM

CROSS-REFERENCE TO RELATED APPLICATION

This application claims priority to Japanese Patent Application No. 2019-200068 filed on Nov. 1, 2019, incorporated herein by reference in its entirety.

BACKGROUND

1. Technical Field

The present disclosure relates to an apparatus that creates a travel plan of a vehicle, a method, and a program.

2. Description of Related Art

In recent years, various business operators have proposed to provide a service using vehicles. In order to provide service, a method is conceivable for a service that a business operator mounts an electrical device on a vehicle and operates the electrical device using the electric power stored in a battery of the vehicle.

In order to provide the service suitably, the energy for operating the electrical device for a service is required to be secure in addition to the energy for the vehicle to travel.

Japanese Unexamined Patent Application Publication No. 2016-203706 (JP 2016-203706 A) discloses an energy management apparatus for vehicle that minimizes fuel consumption to a destination. The apparatus forms a target vehicle speed plan to the destination and a driving necessity plan of a motor, engine, and a generator such that the fuel consumption to the destination is minimized based on vehicle information including at least information on a vehicle speed of an electrified vehicle and a state of charge of the battery, and route information to the destination, and controls the vehicle based on the plans.

SUMMARY

As disclosed in Japanese Unexamined Patent Application Publication No. 2016-203706 (JP 2016-203706 A), in a case where a travel plan is created focusing only on the energy for the functions of the vehicle such as traveling, the energy for the electrical device used for a service other than the functions of the vehicle may be insufficient and a problem may be caused in service provision.

The disclosure provides a plan creation apparatus that creates a travel plan in consideration of operation of an electrical device mounted on a vehicle and used for a service other than functions of the vehicle.

A first aspect of the disclosure relates to a plan creation apparatus including a prediction unit and a planning unit. The prediction unit is configured to acquire an operation plan for an electrical device mounted on a vehicle and used for a service other than functions of the vehicle and to predict a demand for electric power of the electrical device based on the operation plan. The planning unit is configured to create a travel plan in which electric power supplied to the electrical device for the service is secured based on the demand for electric power.

According to the aspect of the disclosure, since a demand for electric power is predicted by acquiring an operation plan of an electrical device used for a service other than functions of a vehicle, a travel plan in consideration of a demand for electric power can be created.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

Hereinafter, embodiments of the present disclosure will be described with reference to the drawings. Since a plan creation apparatus according to the embodiment of the disclosure can predict a demand for electric power of an electrical device based on an operation plan of the electrical device for providing service and create a travel plan including electric power generation and replenishment to cover a demand, the service can be suitably provided without electric power shortage. Also, the plan creation apparatus can predict a demand for a resource according to the service, and create a travel plan including electric power generation and replenishment to cover a demand.

Summary

Figure 1:
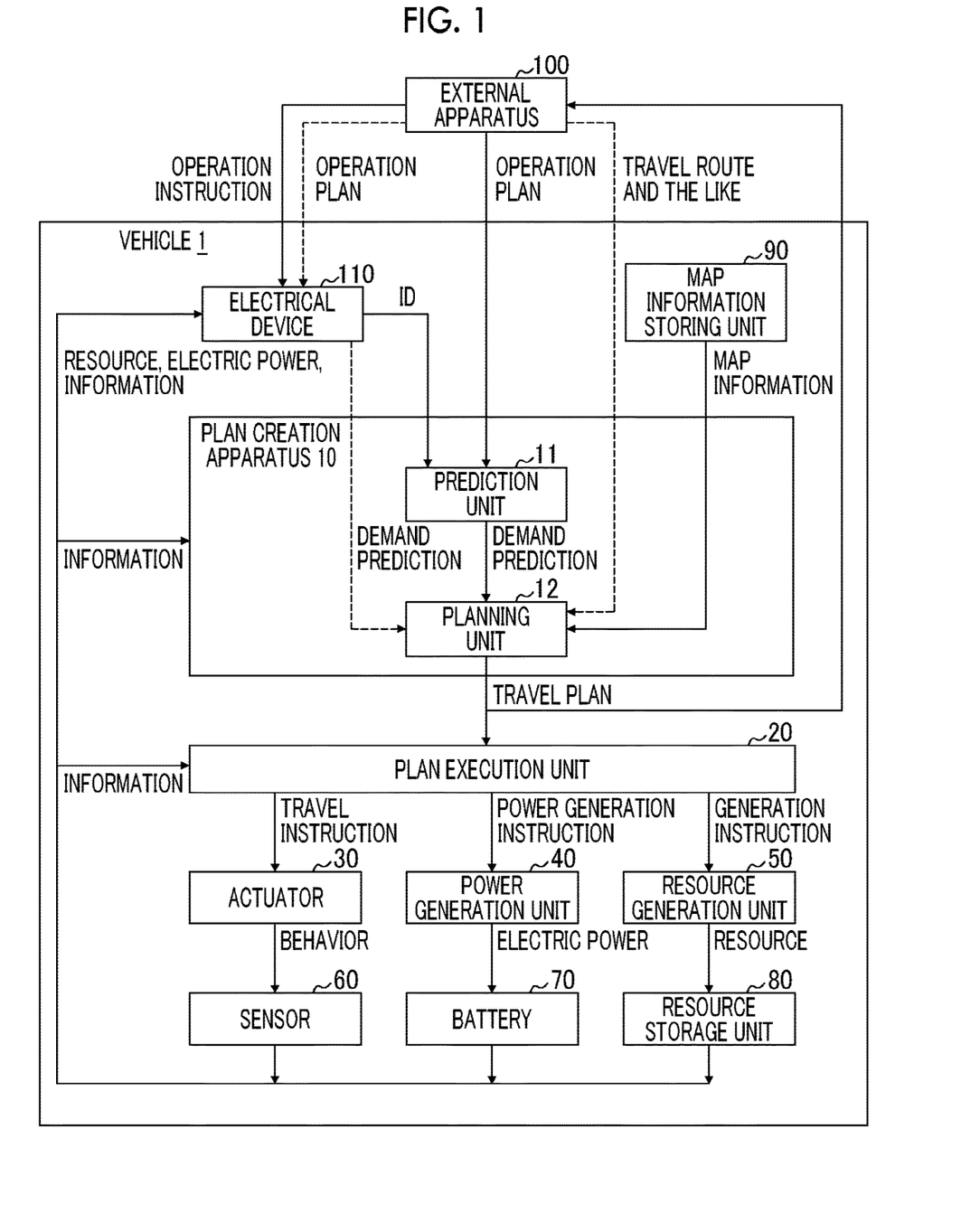
FIG. 1 is a functional block diagram of a plan creation apparatus and peripheral units of the apparatus according to an embodiment of the disclosure.

FIG. 1 shows functional blocks of a plan creation apparatus 10 and peripheral units of the apparatus according to the embodiment of the disclosure and flows of information, control, and electric power between the functional blocks. The plan creation apparatus 10 is mounted on a vehicle 1. The vehicle 1 is mounted with a plan execution unit 20, an actuator 30, a power generation unit 40, a resource generation unit 50, a sensor 60, a battery 70, a resource storage unit 80, a map information storing unit 90, and an electrical device 110. The vehicle 1 can wirelessly communicate with an external apparatus 100 managed by a service operator, and can transmit and receive information to and from the external apparatus 100. The electrical device 110 is a device operated by the service operator to provide goods and benefits to customers as a business. Typically, the electrical device 110 does not include a device that provides basic functions of the vehicle 1, such as traveling, turning, and stopping, or functions relating to the basic functions.

In order to provide service, the service operator provides an operation plan indicating at least one or both of position or time where the electrical device 110 is operated, with respect to the vehicle 1. The plan creation apparatus 10 creates a travel plan such that the operation plan can be realized based on the operation plan or map information stored in the map information storing unit 90. The plan execution unit 20 performs a travel instruction, an electric power generation instruction, and a resource generation instruction of the vehicle 1 with respect to the actuator 30, the power generation unit 40, and the resource generation unit 50 included in the vehicle 1 based on the travel plan.

The actuator 30 is a device that operates according to a travel instruction and executes functions of traveling, turning, and stopping, such as an engine (a motor), electric power steering, or a brake. In a case where the actuator 30 operates, the behavior of the vehicle 1 such as a vehicle speed and inclination changes. The behavior of the vehicle 1 is detected by the sensor 60 such as a vehicle speed sensor or an acceleration sensor, and is provided to the plan creation apparatus 10, the plan execution unit 20, and the electrical device 110.

The power generation unit 40 includes a power generator or a fuel cell, and can generate electric power. The power generator is, for example, an engine and an alternator that generates power by the output of the engine, or a motor that recovers kinetic energy of the vehicle by regenerative power generation. That is, the engine or the motor is the actuator 30 described above, and may be included in the power generation unit 40. In a case where the power generation unit 40 operates according to the power generation instruction, the generated electric power is stored in the battery 70. The electric power of the battery 70 is provided to the electrical device 110, and may be provided to units shown in FIG. 1 or devices not shown in FIG. 1, such as the actuator 30 included in the vehicle 1.

The resource generation unit 50 is a device that generates a resource used for the service. In a case where the resource generation unit 50 operates according to the generation instruction, the generated resource is stored in the resource storage unit 80. The resource stored in the resource storage unit 80 is provided to the electrical device 110.

The vehicle 1 may be an unmanned autonomous driving vehicle, or may be occupied by a person. In a case where a person gets on the vehicle 1, the vehicle 1 may perform autonomous driving according to the travel instruction as described above, or may be driven by a person according to a travel plan instead.

Details

The external apparatus 100 generates an operation plan based on the input by the business operator. The operation plan includes a position, a time, or operation setting in which the electrical device 110 operates, in order to provide a service. The operation plan is acquired by the plan creation apparatus 10. The external apparatus 100 generates an operation instruction for operating the electrical device 110 according to the operation plan. The operation instruction is an individual operation instruction such as power on/off of the electrical device 110, operation setting, or reservation setting. The operation instruction is acquired by the electrical device 110.

The plan creation apparatus 10 includes a prediction unit 11 and a planning unit 12. The prediction unit 11 creates an electric power demand prediction that is a prediction of a demand for electric power to be supplied to the electrical device 110 and provides the electric power demand prediction to the planning unit 12, based on the operation plan. The prediction unit 11 creates a resource demand prediction that is a prediction of a demand for a resource to be supplied in a case where the electrical device 110 operates in order to realize the operation plan. These demand predictions include a position, a time, and an amount at which electric power or resource is to be provided to the electrical device 110 in order to provide a service.

In the above description, the prediction unit 11 creates a demand prediction, but, as indicated by a dotted line in FIG. 1, the electrical device 110 may have functions of acquiring the operation plan from the external apparatus 100 and creating a demand prediction based on the acquired operation plan, and may provide the created demand prediction to the planning unit 12. Variations of the demand prediction method will be described below.

The planning unit 12 acquires the demand prediction. The planning unit 12 can refer to map information stored in the map information storing unit 90. The map information storing unit 90 may be provided as, for example, a part of a navigation system. The map information includes a position of the replenishing station where fuel or resource can be replenished and information on the energy consumed or recovered due to traveling in order to secure the electric power or the resource. The information on the energy consumed or recovered due to traveling is information indicating energy requested or obtained in a case where the vehicle travels in a section of the road by using the gradient of the section or the road surface condition.

The planning unit 12 creates a travel plan based on the demand prediction and the map information. The travel plan includes a travel route that is determined such that demands (a position, a time, and an amount) are secured according to the demand prediction, a replenishing position, a replenishing amount, a power generation amount of the power generation unit 40, and a resource generation amount of the resource generation unit 50, or the time when the vehicle passes each position on the travel route, and the time of replenishing, power generation, and resource generation. The travel plan may include a travel method of the vehicle 1. The travel method is to regulate travel style of the vehicle 1 such as a normal mode in which the allowable range of acceleration and deceleration of the vehicle 1 is a fixed range, a mode in which the allowable range is narrower or wider than the normal mode. As described above, the travel plan includes a replenishing plan of the electric power or the resource and the generation plan in addition to traveling.

The planning unit 12 creates the travel plan such that the given index is optimized (maximized or minimized). The optimization of the index is, for example, to minimize the index such as fuel efficiency, travel distance, travel time, or replenishing amount and replenishing time, and the efficiency of the service business can be improved due to the optimization.

The planning unit 12 performs optimization such that various restraint conditions other than the demand prediction or the map information are satisfied. Examples of the restraint conditions include capacity of the resource storage unit 80, capacity of the battery 70, the power generation efficiency, the resource generation efficiency, and correlation between power generation amount and resource generation amount. The planning unit 12 creates the travel plan in consideration of the current resource storage amount or the current power storage amount, the fuel efficiency of the vehicle 1, the current amount of fuel, a demand for electric power. The specific algorithm of plan creation is not limited, and a general optimization method can be appropriately adopted.

In the above description, the planning unit 12 creates the travel plan, but, as indicated by a dotted line in FIG. 1, the external apparatus 100 may provide a part of the travel plan, such as a travel route, replenishing position, and a travel mode, to the planning unit 12. Variations of the creation methods of the travel plan will be described below.

Figure 2:
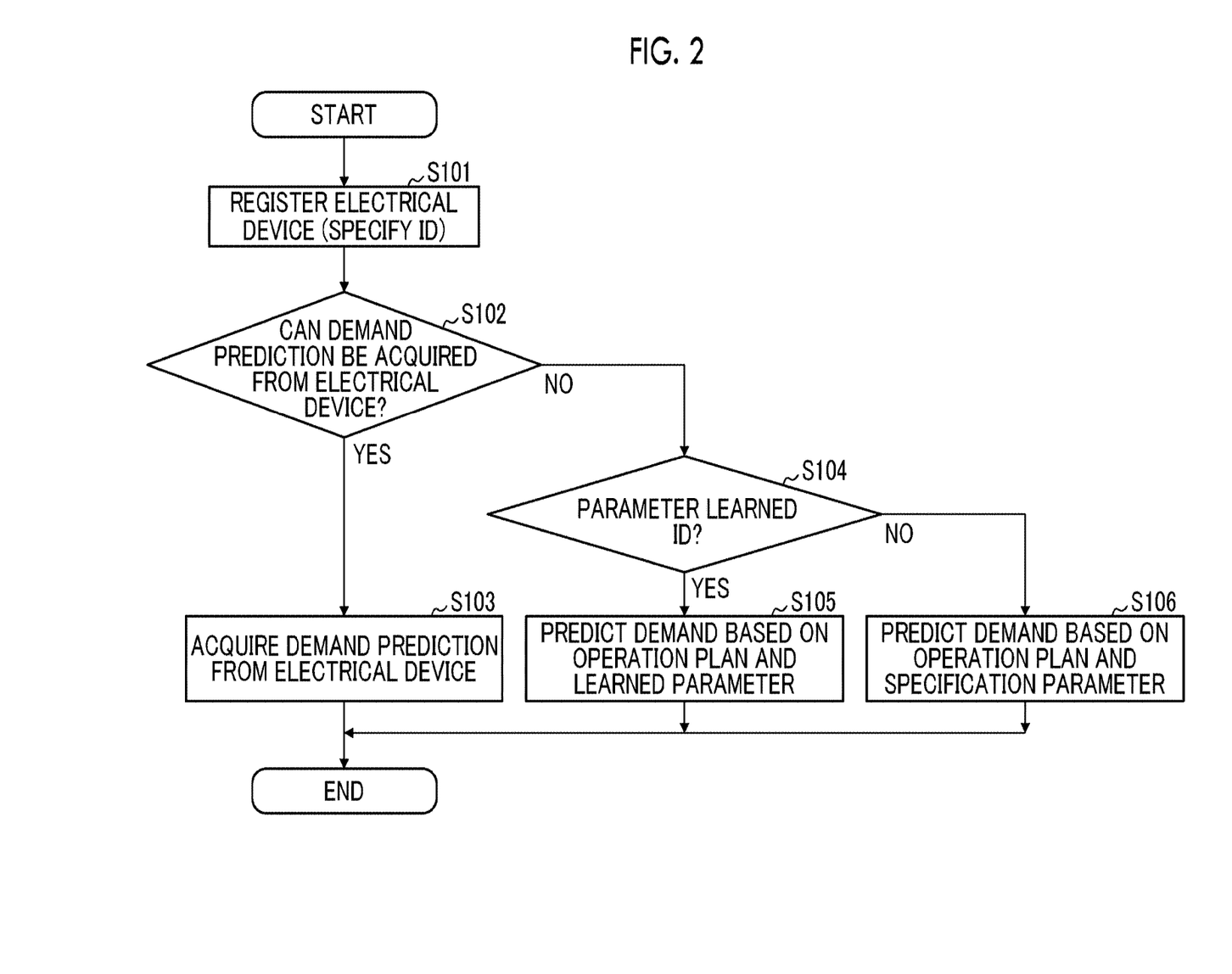
FIG. 2 is a flowchart showing the creation of a demand prediction according to the embodiment of the disclosure.

The variations of the demand prediction method will be described with reference to the flowchart shown in FIG. 2.

Step S101: The plan creation apparatus 10 registers the electrical device 110. For example, pairing is performed in accordance with a predetermined wireless communication standard, and the plan creation apparatus 10 acquires an identifier (ID) for identifying the electrical device 110. The registering processing may be performed by the plan creation apparatus 10 automatically as described above, or may be performed by the business operator manually.

Step S102: In a case where the plan creation apparatus 10 acquires the demand prediction from the electrical device 110, the processing proceeds to step S103, and in a case where the electrical device 110 does not have a creation function of the demand prediction and the plan creation apparatus 10 cannot acquire the demand prediction from the electrical device 110, the processing proceeds to step S104.

Step S103: The plan creation apparatus 10 adopts the demand prediction acquired from the electrical device 110. The flow now ends.

Step S104: The plan creation apparatus 10 determines whether the ID of the electrical device 110 is a parameter learned ID. The parameter is, for example, information that can be used for the demand prediction, such as consumption rate of the electric power of the electrical device 110 or the resource. In a case where the electrical device 110 has operated in the past, the plan creation apparatus 10 corrects, for example, the manufacturer's nominal specification value based on the operation results, and learns the parameter with improved precision in association with the ID. The plan creation apparatus 10 can inquire of other vehicles or a server outside the vehicle about the parameter learning content of the electrical devices of the same manufacturer and model that can be specified from the IDs. In a case where the ID of the electrical device 110 is the ID of the electrical device in which the learned parameter is present in the vehicle 1, the other vehicle, or the server, the processing proceeds to step S105, and in the opposite case, the processing proceeds to step S106.

Step S105: The plan creation apparatus 10 creates the demand prediction based on the operation plan and the learned parameter of the electrical device 110. The flow now ends.

Step S106: The plan creation apparatus 10 creates the demand prediction based on the operation plan and the specification value of the parameter of the electrical device 110. For example, the parameter on the specification can be specified by inquiring of the server or manufacturer based on the ID of the electrical device 110. The flow now ends.

Figure 3:
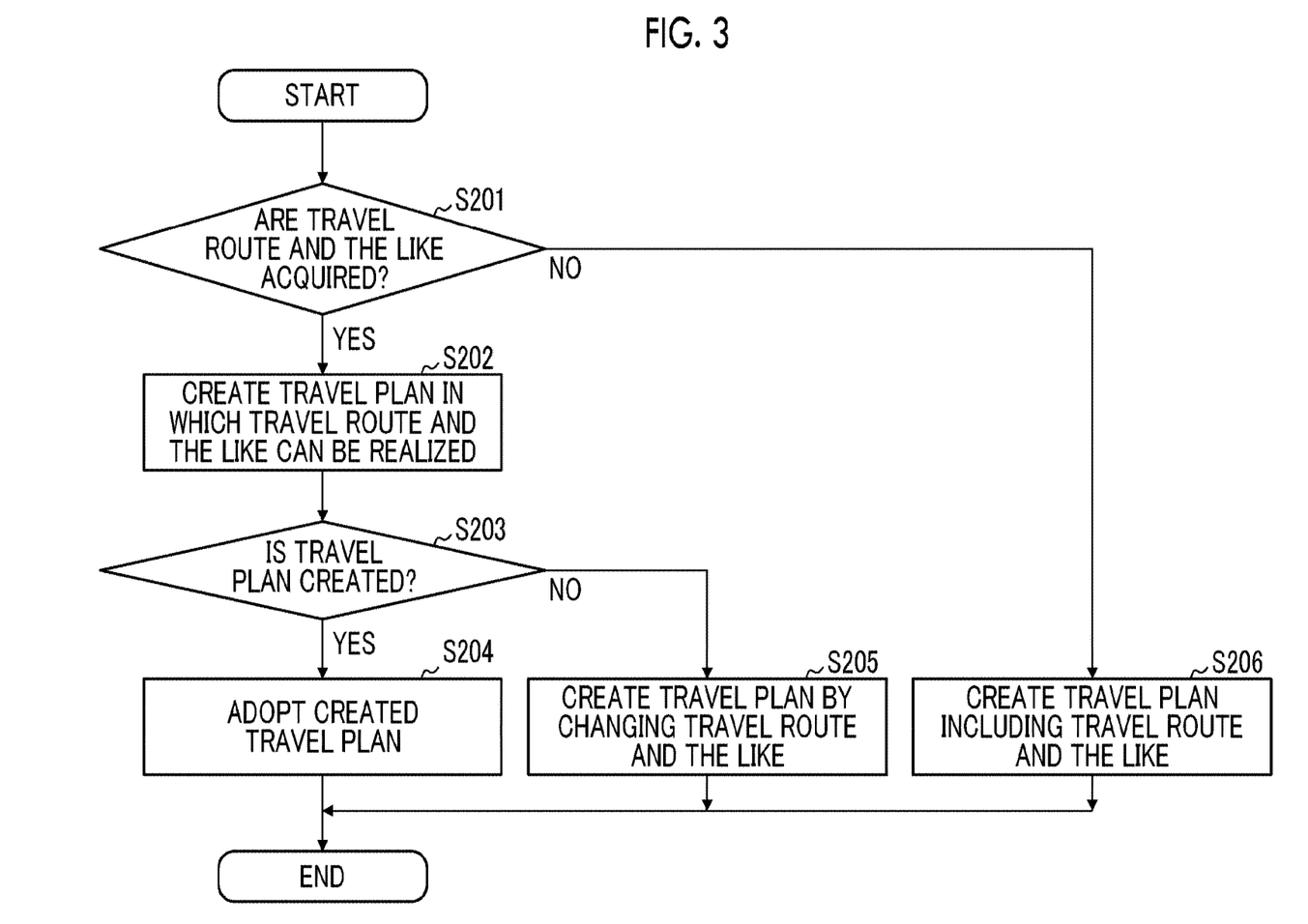
FIG. 3 is a flowchart showing the creation of a travel plan according to the embodiment of the disclosure.

The variation of the creation method of the travel plan will be described with reference to the flowchart shown in FIG. 3.

Step S201: In a case where the planning unit 12 acquires the travel route and the like from the external apparatus 100, the processing proceeds to step S202. In a case where the planning unit 12 does not acquire the travel route and the like, the processing proceeds to step S206.

Step S202: The planning unit 12 creates the travel plan by adding the acquired travel route and the like to the restraint condition.

Step S203: In a case where the travel plan that satisfies the restraint condition can be created, the processing proceeds to step S204, and in a case where the travel plan that satisfies the restraint condition cannot be created, the processing proceeds to step S205.

Step S204: The planning unit 12 adopts the travel plan created in step S202. The flow now ends.

Step S205: The planning unit 12 creates the travel plan by changing the acquired travel route and the like. In a case where the travel route and the like are changed, the planning unit 12 creates the travel plan such that the changing amount is minimized, and the demand prediction or the restraint condition after the travel route is changed is satisfied. The flow now ends.

Step S206: Since the planning unit 12 does not acquire the travel route from the external apparatus 100, the planning unit 12 creates the travel plan including the travel route. The flow now ends.

In a case where the planning unit 12 changes the travel route and the like acquired from the external apparatus 100, or in a case where the planning unit 12 does not acquire the travel route and the like from the external apparatus 100, the planning unit 12 transmits and gives a notice of the created travel plan to the external apparatus 100.

The plan execution unit 20 acquires the travel plan. The plan execution unit 20 generates the travel instruction for controlling the travel of the vehicle 1 and controls the actuator 30 based on the travel plan. The sensor 60 detects the behavior of the actuator 30 or the vehicle 1. The detection result is provided to, for example, the plan creation apparatus 10 or the plan execution unit 20, and is used for the parameter learning or feedback controlling of the travel. Also, the detection result is provided to the electrical device 110, and for example, the electrical device 110 can start operation after the vehicle 1 stops on the flat road surface.

The plan execution unit 20 generates the power generation instruction for controlling the power generation of the power generation unit 40 and controls the power generation unit 40 based on the travel plan. The generated electric power is stored in the battery 70 and supplied to the electrical device 110 and the like. Also, information on the power storage amount of the battery 70 is provided to the plan creation apparatus 10 or the plan execution unit 20, and is used for the parameter learning or the feedback control of the power generation.

The plan execution unit 20 generates the generation instruction for controlling the generation of the resource generation unit 50 and controls the resource generation unit 50 based on the travel plan. The generated resource is stored in the resource storage unit 80 and supplied to the electrical device 110. Also, information on the storage amount of the resource storage unit 80 is provided to the plan creation apparatus 10 or the plan execution unit 20, and is used for the parameter learning or the feedback control of the generation.

The above described configuration and processing may be appropriately changed depending on the configuration of the vehicle or the service contents, and characteristic of the electrical device 110 or the resource. Items regulated by the travel plan, various kinds of information used to create the travel plan, or the restraint condition may be appropriately omitted or added. In particular, in a case where the service does not need the resource, the demand prediction of the resource or the travel plan in consideration of the demand prediction of the resource may not be created. The function of the plan execution unit 20 may be integrated with the plan creation apparatus 10.

Figure 4:
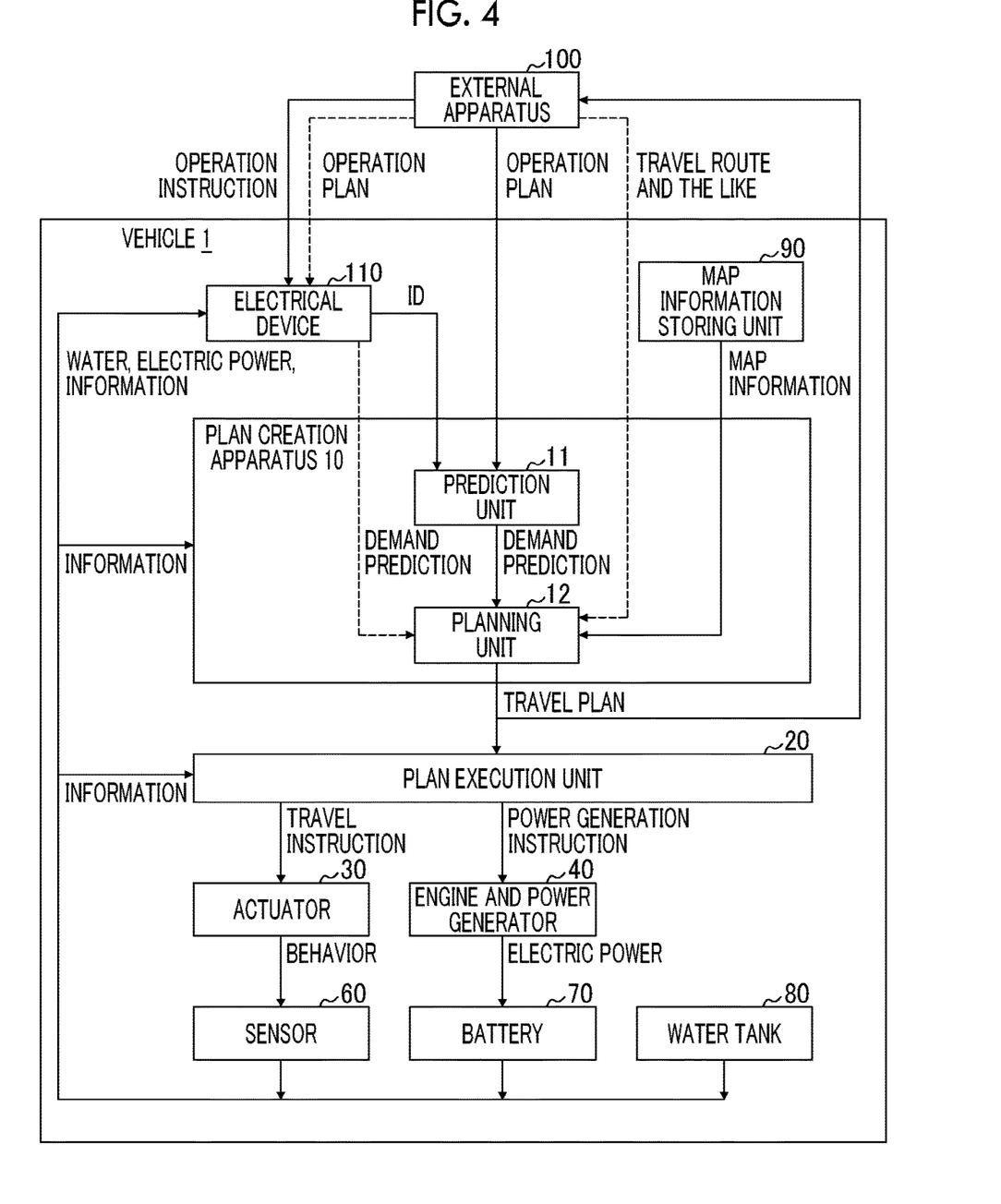
FIG. 4 is a functional block diagram of the plan creation apparatus and the peripheral units of the apparatus according to an example of the disclosure.

Specific examples are described with reference to FIGS. 4 and 5. The configuration shown in FIG. 4 is an example of a case where a visitation laundry service is performed as the service. In the service, the laundry is received from the customer at the designated position and time, is washed, and is returned to the customer at the designated position and time. A washing machine is the electrical device 110, and water is the resource. The vehicle 1 is a gasoline-powered vehicle.

In the example, the engine and the power generator 40 are the power generation unit. The engine is the actuator 30 for traveling. The resource generation unit that generates water is not provided, and water is replenished at the replenishing station to the resource storage unit that is a water tank 80. In the example, the predictions of demands for electric power and water are created based on the operation plan of the washing machine and the setting content or the parameter of the washing machine. The travel plan is created including the travel route, the replenishing plan, the power generation plan, and the travel method based on information on the positions of the replenishing stations of gasoline, electric power, and water, power generation rate due to the gasoline consumption, the full capacity and the power storage amount of the battery 70, the full capacity and the storage amount of the water tank, the reception location and time, and the returning location and time. As the travel method, a travel method is selected in which the vehicle travels with a narrower allowable range of acceleration and deceleration such that water in the water tank does not shake. The plan execution unit 20 performs the travel instruction and the power generation instruction based on the travel plan, but, the plan execution unit does not generate water and does not perform generation instruction.

Figure 5:
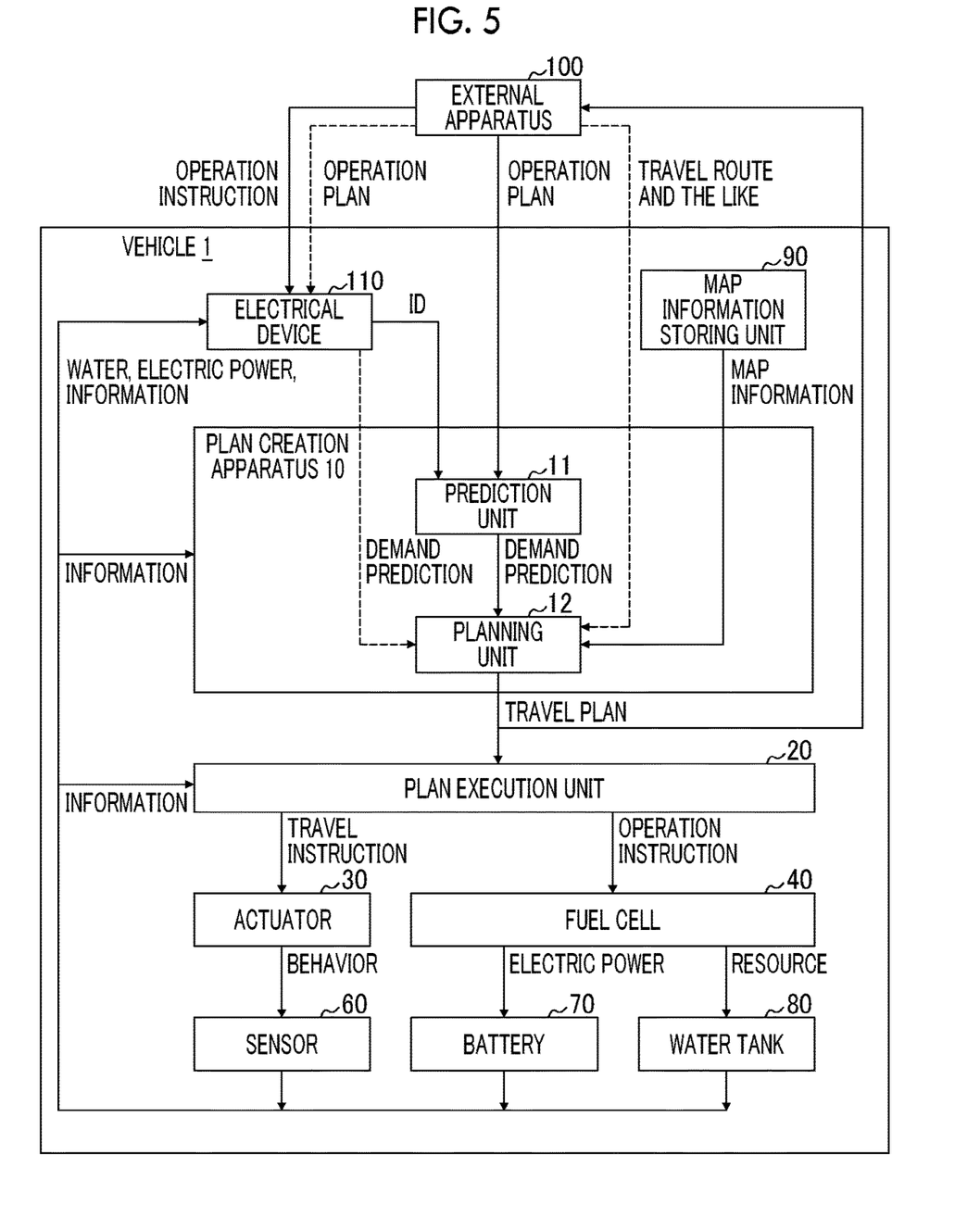
FIG. 5 is a functional block diagram of the plan creation apparatus and the peripheral units of the apparatus according to the example of the disclosure.

In the configuration shown in FIG. 5, a service is a visitation laundry service in similar to the above example. The vehicle 1 is different from the above example, and is a fuel cell vehicle (FCV) using a hydrogen fuel cell.

In the example, the fuel cell 40 is the power generation unit and the resource generation unit. Water is generated from the fuel cell 40, is replenished at the replenishing station, and is stored in the resource storage unit that is the water tank 80. In the example, the predictions of demands for electric power and water are created based on the operation plan of the washing machine and the setting content or the parameter of the washing machine. The travel plan is created including the travel route, the replenishing plan, the power generation plan, the water generation plan, and the travel method based on information on the positions of the replenishing stations of hydrogen, electric power, and water, the power generation rate and the water generation rate due to the hydrogen consumption, the full capacity and the power storage amount of the battery 70, and the full capacity and the storage amount of the water tank, the reception location and time, and the returning location and time. As in the above example, as the travel method, a travel method is selected in which the vehicle travels with a narrower allowable range of acceleration and deceleration such that water in the water tank does not shake. The plan execution unit 20 collectively performs the power generation instruction and the water generation instruction as operation instructions for the fuel cell 40.

Examples of the service include replenishing food materials as resource, cooking and selling the food materials using cooking equipment as electrical device in addition to the visitation laundry service. The kind and the number of the electrical devices and the kind and the number of the resources are not limited. In addition to the electrical device and the resource, in a case where heat from gasoline combustion is stored in water and is used for bathing service, a heat demand prediction may be created and used for creating the travel plan.

In the embodiment, the plan creation apparatus 10 is described to be mounted on the vehicle, but the embodiment is not limited thereto, and the plan creation apparatus 10 may be included in the server that can communicate with the vehicle wirelessly or by wire.

Advantages

In the embodiment, since the prediction of the demand for electric power of the electrical device can be performed and the travel plan including power generation and the replenishing such that the demand is satisfied can be created based on the operation plan of the electrical device for providing the service, the service can be suitably provided without electric power shortage.

The disclosure relates to a plan creation method executed by a plan creation apparatus having a processor and a memory, a plan creation program, a computer-readable non-temporary storage medium storing the plan creation program, and a vehicle including the plan creation apparatus, as well as a plan creation apparatus.

The disclosure is useful for a plan creation apparatus applied to a vehicle or the like.

What is claimed is:

1. A plan creation apparatus comprising:
a processor and a memory coupled to the processor, the processor, through execution of instructions stored in the memory, being configured to
acquire an operation plan for an electrical device mounted on a vehicle and used for a service to predict a demand for electric power of the electrical device based on the operation plan;
create a travel plan in which the electric power supplied to the electrical device for the service is secured based on the demand for electric power; and
control operation of the vehicle in accordance with the travel plan,
wherein the electrical device is operated by a service operator to provide the service which is at least one of a visitation laundry service or bathing service to a customer as a business,
wherein when the plan creation apparatus is mounted on a hydrogen vehicle, the processor, through execution of the instructions stored in the memory, is further configured to create the travel plan, including a travel route, a power generation plan, a water generation plan, and a travel method,
wherein the travel plan ensures the electric power supplied to the vehicle is secured, and
the travel plan is further based on the demand for electric power, a demand for water, information on positions of replenishing stations of hydrogen, electric power, and water, a power generation rate and a water generation rate due to hydrogen consumption, a full capacity and a power storage amount of a battery of the vehicle, and a full capacity and a storage amount of water in a tank of the vehicle.

2. The plan creation apparatus according to claim 1, wherein the processor, through execution of the instructions stored in the memory, is further configured to:
further predict a demand for a resource used for the service based on the operation plan; and
create a travel plan in which the resource further supplied for the service is secured based further on the demand for the resource.

3. The plan creation apparatus according to claim 1, wherein the processor, through execution of the instructions stored in the memory, is further configured to create a travel plan including a travel route of the vehicle based further on map information.

4. The plan creation apparatus according to claim 3, wherein the map information includes a position of a replenishing station and information on an energy consumed or recovered by traveling.

5. The plan creation apparatus according to claim 4, wherein the processor, through execution of the instructions stored in the memory, is further configured to create a travel plan including a replenishing plan at the replenishing station and a generation plan to generate the electric power.

6. The plan creation apparatus according to claim 1, wherein the processor, through execution of the instructions stored in the memory, is further configured to acquire a travel route of the vehicle and to create a travel plan to travel on the acquired travel route based on map information.

7. The plan creation apparatus according to claim 6, wherein the processor, through execution of the instructions stored in the memory, is further configured to create a travel plan to travel on a different travel route in a case where the travel plan to travel on the acquired travel route is not able to be created.

8. The plan creation apparatus according to claim 1, wherein when the visitation laundry service is provided and the vehicle is a fuel cell vehicle that uses hydrogen fuel, water generated by the fuel cell is used for the visitation laundry service.

9. The plan creation apparatus according to claim 1, wherein the electrical device does not provide any vehicle-related functions.

10. The plan creation apparatus according to claim 1, wherein the vehicle is an autonomous vehicle.

11. A plan creation method executed by a plan creation apparatus, the method comprising:
acquiring, with a processor, an operation plan for an electrical device mounted on a vehicle;
predicting, with the processor, a demand for electric power of the electrical device based on the operation plan;
creating, with the processor, a travel plan in which the electric power supplied to the electrical device for the service is secured based on the demand for electric power; and
controlling operation of the vehicle in accordance with the travel plan,
wherein the electrical device is operated by a service operator to provide the service which is at least one of a visitation laundry service or bathing service to a customer as a business,
wherein when the plan creation apparatus is mounted on a hydrogen vehicle, the processor, through execution of the instructions stored in the memory, is further configured to create the travel plan, including a travel route, a power generation plan, a water generation plan, and a travel method,
wherein the travel plan ensures the electric power supplied to the vehicle is secured, and
the travel plan is further based on the demand for electric power, a demand for water, information on positions of replenishing stations of hydrogen, electric power, and water, a power generation rate and a water generation rate due to hydrogen consumption, a full capacity and a power storage amount of a battery of the vehicle, and a full capacity and a storage amount of water in a tank of the vehicle.

12. A non-transitory computer-readable medium encoded with computer-readable instructions that, when executed by a processor that is coupled to the non-transitory computer-readable medium, cause the processor to perform a method comprising:
acquiring an operation plan for an electrical device mounted on a vehicle;
predicting a demand for electric power of the electrical device based on the operation plan;
creating a travel plan in which the electric power supplied to the electrical device for the service is secured based on the demand for electric power; and
controlling operation of the vehicle in accordance with the travel plan,
wherein the electrical device is operated by a service operator to provide the service which is at least one of a visitation laundry service or bathing service to a customer as a business,
wherein when the processor is included in a plan creation apparatus is mounted on a hydrogen vehicle, the processor, through execution of the instructions stored in the memory, is further configured to create the travel plan, including a travel route, a power generation plan, a water generation plan, and a travel method,
wherein the travel plan ensures the electric power supplied to the vehicle is secured, and
the travel plan is further based on the demand for electric power, a demand for water, information on positions of replenishing stations of hydrogen, electric power, and water, a power generation rate and a water generation rate due to hydrogen consumption, a full capacity and a power storage amount of a battery of the vehicle, and a full capacity and a storage amount of water in a tank of the vehicle.

* * * * *